Jan. 31, 1967   L. H. PERRY   3,301,568
FLUID SEAL
Filed May 28, 1963   2 Sheets-Sheet 1
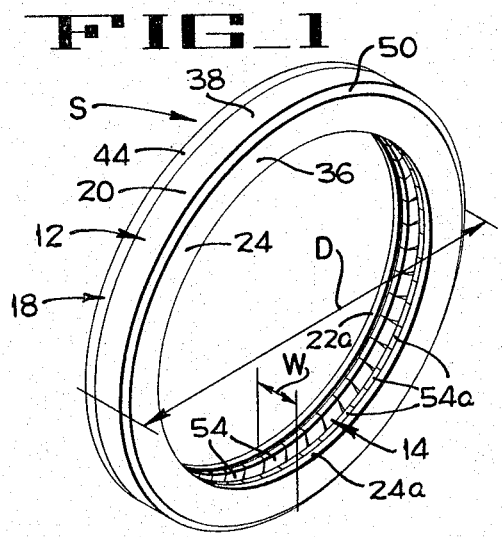
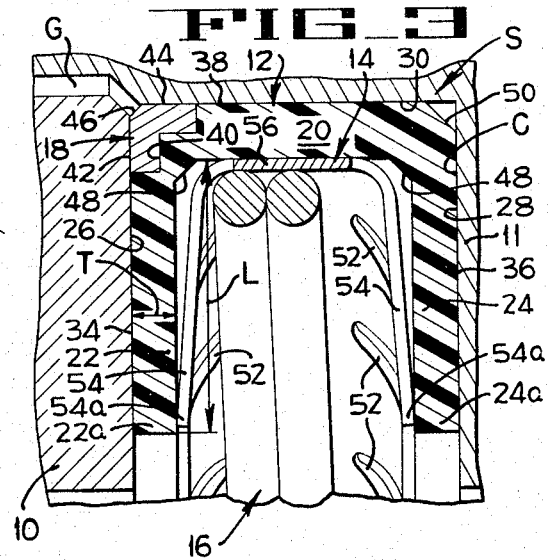
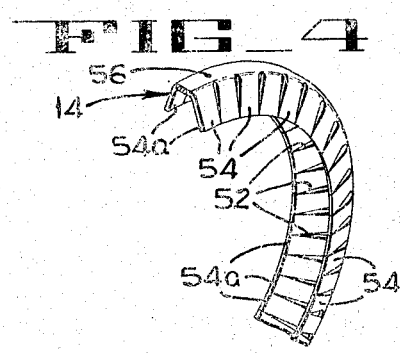
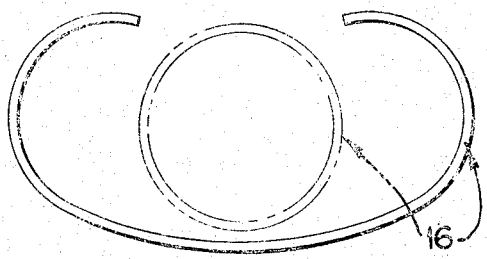
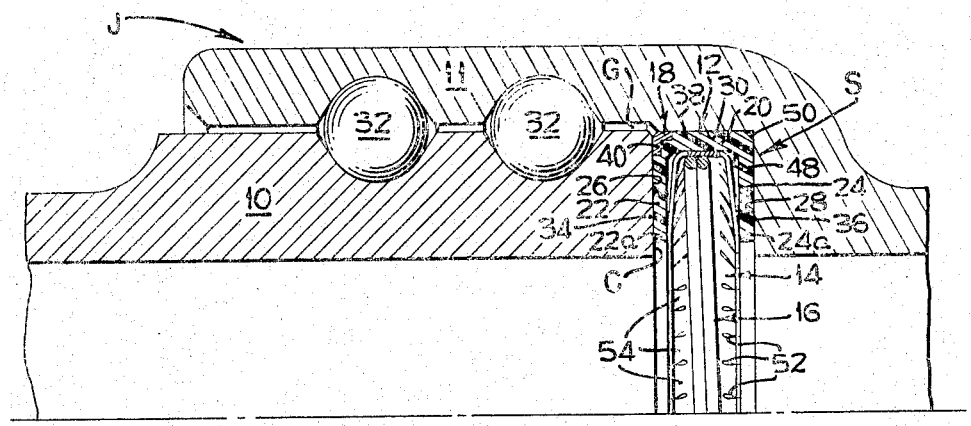
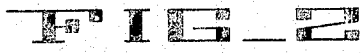
INVENTOR
LANDIS H. PERRY
ATTORNEY

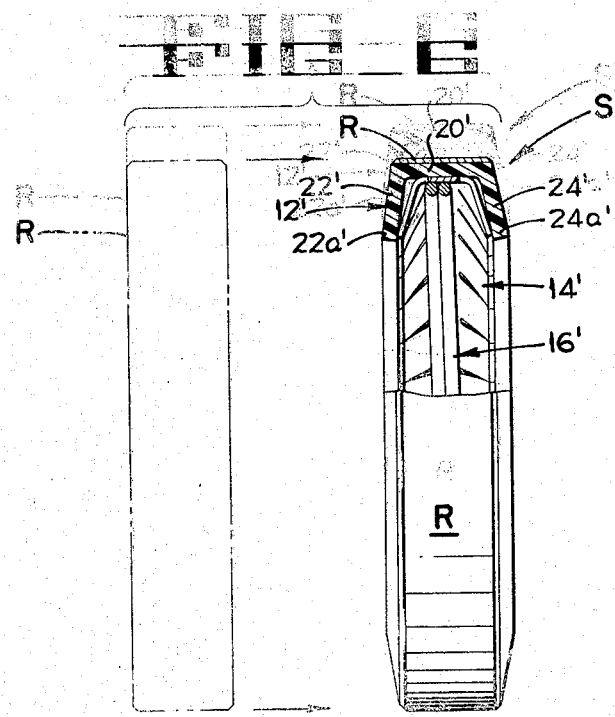
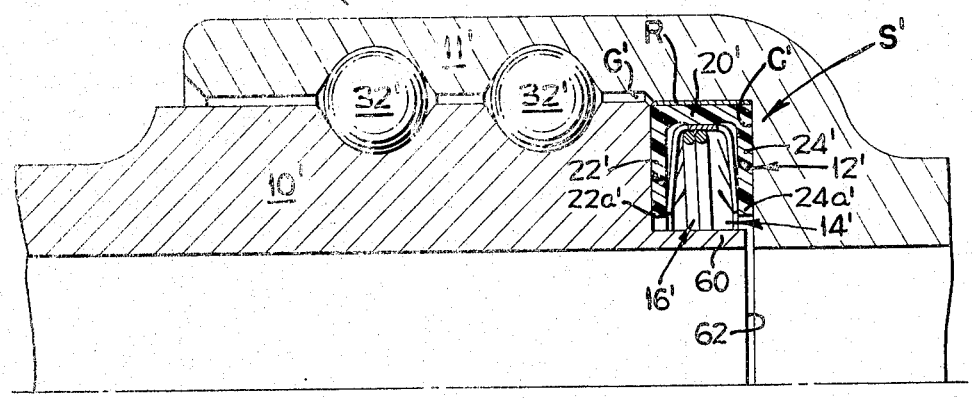

United States Patent Office 3,301,568
Patented Jan. 31, 1967

3,301,568
FLUID SEAL
Landis H. Perry, Costa Mesa, Calif., assignor to FMC Corporation, San Jose, Calif., a corporation of Delaware
Filed May 28, 1963, Ser. No. 283,730
8 Claims. (Cl. 277—142)

This invention relates to seals, and fluid-tight pipe joints employing such seals, capable of handling fluids having a wide range of temperatures and pressures. More particularly, the invention is concerned with the provision of a swivel pipe joint and a swivel joint seal capable of handling fluid under considerable pressures at temperatures which may extend into the cryogenic range.

Few, if any, satisfactory swivel joints have been developed for use with fluids having temperatures that may range from —300° F. to +400° F. because excessive demands are made upon the seal elements employed in such joints under these extremes of temperature. In fact, few swivel joints operate satisfactorily even when they are specifically designed and exclusively used with fluids having temperatures near either extreme of the above mentioned range. This situation exists in spite of the growing demand in the aero-space and heat exchanger industries for swivel joint and pipeline seals capable of operating over a temperature range of 600° F. at pressures as high as 8000 p.s.i.

It is therefore an object of this invention to provide an improved fluid seal and more particularly an improved swivel pipe joint seal.

Another object of the invention is to provide a pipe joint seal which is capable of operating effectively when subjected to extremely low temperatures.

Another object of this invention is to provide a pipe joint seal capable of operating effectively over a wide range of temperatures.

Another object of the present invention is to provide a seal for use in a swivel joint or pipeline which is capable of conducting fluids under considerable pressure at cryogenic temperatures.

Another object of the present invention is to provide a seal element for a swivel joint for conducting fluids having temperatures and pressures that may vary over a wide range, which seal element does not require highly accurate or highly finished surfaces on the swivel joint members.

Another object of the present invention is to provide an effective way in which a simple and inexpensive swivel joint seal may be formed and employed to maintain a fluid-tight joint over a wide range of temperatures and pressures.

The most successful type of conventional swivel joint seal investigated during the development of this invention was that in which the seal elements were composed solely of metal. These seals were fairly satisfactory at moderate temperatures and pressures, but as the fluid temperature was increased beyond +300° or lowered beyond —100° F., leakage occurred and the joint was rendered unserviceable. It was also found that failure could be avoided, even when the temperature was increased somewhat if the pressure was maintained moderately positive and if extreme care was taken in the machining and preparation of the joint interfaces. Nevertheless, because of the inability of such joints to handle fluids at reasonable pressures over the wide range of temperatures desired, joints incorporating such seals were held to be unsatisfactory. Furthermore, owing to the extreme precision and elaborate surface coating techniques employed in manufacture, such joints are most expensive.

The most common form of swivel joint seal employs at least one elastomeric seal element which depends upon its inherent resilience and flexibility to maintain a fluid-tight joint. However, these seals failed repeatedly at a moderate temperature and were generally unsatisfactory outside the range of 30 to 200° F. Failure was often accelerated by the nature of the fluids handled since many oils and petroleum products react chemically with most elastomeric materials, causing their degeneration. Unfortunately, one of the first signs of chemical degeneration in such materials is the loss of resilience, and early leakage therefore occurs in these seals through failure of the material to maintain resilient contact with the swivel joint members. In the negative temperature range, seals employing elastomeric sealing elements were found to be most unsatisfactory.

Finally, seals which employ non-metallic and non-elastomeric seal elements were generally more successful than the elastomeric type and more economical than the metallic type, but these seals were found to have about the same useful temperature range as the metallic seals. Typical seals of this nature which were tested were those covered by United States Patent No. 2,512,883 to Warren and those covered by Patent No. 2,789,847 to Jackson, both of which patents are owned by the assignee of the present invention. Another advantage of this type of seal is that many of the substances employed are substantially inert and may be used to handle a variety of fluids which would be detrimental to elastomeric seals.

However, like the metallic seals, it was found that the non-elastomeric seal elements were generally unable to maintain a fluid-tight, low-torque swivel joint seal under low pressures or low temperatures. Where the fluid pressure was moderate and the temperature was close to the lower limit of the desired range, considerable leakage was found to occur in swivel joints employing such seals. However, provided the pressure was low, the seal elements were found not to be damaged by such leakage, except through erosion caused by the leaking fluid, and many of the seal elements were reusable. But, with the application of high pressures at low temperatures, the seal elements not only failed to maintain a fluid-tight seal but were unable to recover owing to cracking and rupture.

During the development of this invention, the causes of failure in the various types of swivel joint seals were extensively investigated. It was found that, generally speaking, metal seals failed because of the inability of the lubricants employed to stand up to the severe temperature conditions. Once galling of the highly finished surfaces had been initiated through such lubricant failure, it rapidly accelerated to a state where the seal was unusable because of considerable leakage. The results were little better when the joint surfaces were machined optically flat and were impregnated with solid lubricants thought to be capable of withstanding the temperature extremes.

An investigation of the causes of elastomeric seal failure indicated that the difficulties could be attributed to the loss of elasomeric qualities in the seal elements through chemical degeneration, thermal degeneration, or to low temperature embrittlement of the material. A swivel joint which relies upon the inherent resilience of its elastomeric seal element can hardly be expected to remain fluid-tight when the seal element is deprived of that resilience.

The comparative success of the non-elastomeric seal element in handling fluids at high temperature, it was found, could be attributed to the fact that the pressure and temperature of the fluid combine to deform the stiff seal element into tight sealing contact with the swivel joint members. The seal was unsatisfactory at low pressures because the element material has insufficient resilience to maintain sealing contact with the swivel joint members; while, at low temperatures, the seal element material again becomes brittle, is subject to cracking and shrinking and therefore fails to maintain a fluid-tight seal. Furthermore, many non-elastomeric plastic materials were found to flake at their sealing surfaces where relative motion occurs between the material and a swivel joint member, and the flakes were found to collect in small bunches which eventually prevented intimate sealing contact between the seal element and the member. It is thought that flaking of the seal element material is greatly accentuated, if not caused, by high spots on the contacting swivel joint member surface and the life of the seal element can accordingly be prolonged by careful machining of the swivel joint members. However, the effectiveness of such an improvement is strictly limited by the fact that a certain amount of misalignment between the swivel joint members inevitably occurs during use.

Further investigations with seals formed from non-elastomeric plastic materials revealed a surprising result: if a thin envelope of the material was employed in place of the common massive seal element, sufficient flexibility could be retained even under extremely low temperatures to prevent cracking and to maintain a satisfactory seal. Furthermore, in such thin envelopes, their inherent flexibility enables the sealing surface to ride over minor irregularities of the associated swivel joint surface and thereby prevent flaking and bunching of the material. However, even with such thin envelope seal elements, difficulty was experienced in certain cases where cracking was again evident and it was determined that, during use, the envelope had moved slightly away from the seal chamber walls so that, when pressure was applied under low temperature conditions, the material was again stressed beyond its very limited elastic limits. To prevent this, and in accordance with the present invention, a metallic spring energizer has been developed which will retain the seal element in firm contact with the chamber walls under all conditions to minimize envelope movement, even when subjected to pulsating pressures. If adequate force is applied to the wall lips of the thin envelope by the energizer, the seal was found to form an efficient fluid-tight joint even with less than atmospheric pressures.

In short, therefore, the invention lies in the provision of a seal which, in the disclosed embodiment, employs a thin sealing envelope of non-elastomeric plastic material preferably selected from the commerically available polymers of tetrafluoroethylene or trifluorochloroethylene, and a metallic spring energizer which at once provides complete and full support of the sealing lips of the envelope and retains each side of the envelope in firm contact with the seal chamber walls to minimize flexing thereof under pulsating pressures.

In the above discussion and throughout this specification, unless specifically indicated otherwise, "low pressure" refers to a pressure in the range of 5 p.s.i. (absolute) to 100 p.s.i. (absolute); "moderate" or "medium" pressure refers to a pressure within the range 100 to 1500 p.s.i.; while "high pressure" indicates a pressure within the range 1500 to 8000 p.s.i. Also (it should be noted that the term "thin walled envelope" is applied to a seal element having a wall in which its length is at least three times its average thickness; this being in contrast to the known elastomeric seal elements whose walls commonly correspond in length to their thickness.

The manner in which the above stated and other objects and advantages of the present invention can be attained will be apparent from the following detailed description of two seals formed in accordance with the invention. The description will make reference to the accompanying drawings in which:

FIGURE 1 is a perspective of a swivel joint seal formed in accordance with the principles of this invention.

FIGURE 2 is a partial longitudinal section of a swivel pipe joint employing the seal illustrated in FIGURE 1.

FIGURE 3 is an enlarged fragmentary section of the seal and seal chamber of the swivel joint illustrated in FIGURE 2.

FIGURE 4 is a fragmentary perspective of the scalloped energizer ring employed in the seal illustrated in FIGURES 1, 2 and 3.

FIGURE 5 is an elevation of the wire spring employed in the seal illustrated in FIGURES 1–3 drawn to a reduced scale and indicating the free and compressed configurations of the spring.

FIGURE 6 is an elevation with parts broken away of a modified swivel joint seal also formed in accordance with the principles of the present invention.

FIGURE 7 is a longitudinal section of a typical swivel joint employing the modified seal illustrated in FIGURE 6.

Referring generally to FIGURES 1 to 5, the swivel joint seal S illustrated in FIGURE 1 is adapted to be housed within an annular chamber C formed between members 10 and 11 of a swivel joint J shown in FIGURE 2. The seal S includes four parts: an annular seal element or envelope 12, a scalloped spreader ring or energizer 14, an expander spring 16, and anti-extrusion ring 18. Although the first three elements are practically essential in the disclosed embodiment, the anti-extrusion ring may be omitted if the seal will not be used with high fluid pressures. FIGURES 4 and 5 respectively illustrate the energizer 14 and the spring 16 which fit one within the other, inside the envelope 12 (see FIGS. 1 and 3) when the seal S is completed.

The annular envelope 12 is molded to precise tolerances from "Teflon," a common polymer of tetrafluoroethylene, and is of rectangular U-shaped cross section, having a cylindrical back portion 20 and radial side wall portions 22 and 24. The open side of the envelope in the present example faces radially inward and the inner parts of the side walls 22 and 24 which bound the open side form sealing lips 22a and 24a respectively.

As clearly shown in FIGURE 3, the envelope 12 is adapted to fit within the chamber C formed between two swivel joint members 10 and 11 of joint J. The chamber C is bounded by three faces: a radial face 26 on member 10, a radial face 28 and a joining cylindrical face 30 on member 11. As indicated in FIGURE 2, the members 10 and 11 are rotatably held in axial alignment by means of ballbearings 32, and the chamber faces 26 and 30 are separated by a small corner gap G.

Since the envelope 12 is of rectangular U-shaped cross-section and, as subsequently explained, its diameter and width closely approximate the diameter and width of the chamber C, it will have three principal faces corresponding, respectively, to the faces 26, 28 and 30 of the joint members 10 and 11. Specifically, when the seal S is housed within the chamber C as illustrated in FIGURES 2 and 3 external radial faces 34 and 36 of the seal envelope are in contact with radial faces 26 and 28, respectively of the swivel joint members 10 and 11 and the external cylindrical face 38 is in contact with the cylindrical surface 30 of the swivel joint member 11. The radial faces 34 and 36 bound the side wall portions 22 and 24 of the envelope, while the cylindrical face 38 bounds the back portion 20.

Since the seal S may be employed with high fluid pressures, there is some danger that a portion of the envelope material might be extruded into the gap G unless the anti-extrusion ring 18 is employed to block the gap. The ring 18 is of conventional design, being formed from stainless steel and being L-shaped in section. Accordingly, in the case of seals S intended for high pressure service, the exterior envelope corner formed by the faces 34 and 38 is recessed or stepped at 40 to accommodate the anti-extrusion 18 so that the radial face 42 of the ring will be flush with the envelope surface 34 and the cylindrical periphery 44 of the ring will be flush with the cylindrical surface 38 of envelope 12. Any sharp edges or burrs on the corner of the anti-extrusion 18 are eliminated by the formation of a chamfer 46 which is disposed opposite the gap G when the seal S is in place within the chamber C.

It is important to note, however, that the provision of the anti-extrusion 18 is not essential to the invention as it is a matter of common practice in the formation of high pressure seals. Where, as in the present case, an anti-extrusion ring is desirable it will probably be necessary to increase the thickness of the cylindrical back portion 20 of envelope 12 with respect to the thickness of side wall portions 22 and 24 so that the junction of the back 20 and wall 22 will not be weakened.

Since the material "Teflon" of the envelope 12 is comparatively rigid and non-elastic as compared to elastomeric materials, care is taken in accordance with the present invention to ensure that thermal expansion or contraction of the material may occur without the generation of undue stresses or of leakage. An important way in which this object is achieved has to do with the shape and dimensions of the envelope 12. The envelope is formed with its outer diameter D (FIG. 1) very closely approximating the diameter of the cylindrical surface 30 of chamber C, and with its width W closely corresponding with the spacing of the joint surfaces 26 and 28.

For the temperature range anticipated in this case, neither the width nor the diameter of the envelope need exceed that of the chamber C, but each should be within $5/1000$ of an inch of the corresponding chamber dimension. Were the seal to be subjected to cryogenic temperatures, it would be desirable to make the diameter and width of the envelope slightly larger than the diameter and width of the chamber so that, when the seal is inserted within the chamber, the envelope material is prestressed and the effect of shrinkage under such temperatures is reduced. To place such seals within their chambers, it is often necessary to chill them by dipping in liquid nitrogen or the like. It should be noted that the diameter D and width W of the envelope 12 are determined before the energizer 14 and expander 16 have been inserted so as to avoid the effect of distortion produced thereby.

The envelope 12 is further assisted in withstanding thermal and hydrostatic stresses by the relief of the corners formed by the junction of the wall portions 22 and 24 with the back or base portion 20. Internally, this is done by the provision of fillets 48 which reduce the stress concentration at the corners when the walls move with respect to the base; and, externally, it is done by a chamfer 50 formed at the external junction of the radial envelope surface 36 and the cylindrical envelope surface 38. The effect of the latter relief is to permit the axial width of the cylindrical surface 38 to be made substantially less than the width W of the envelope 12 and it has been found that, if this is the case, troublesome cracking of the envelope material under low temperature and high pressure conditions is practically eliminated.

Finally, the ability of the envelope 12 to seal subatmospheric pressures, as well as high positive pressures, at low temperatures is substantially increased in accordance with the present invention by ensuring that the wall portions 22 and 24 are "thin." That is, the radial length L of each wall portion, measured from the base 20 to the inner edge or lip 22a or 24a of the wall, is large in relation to the thickness T of each wall portion. An advantageous ratio of wall length to wall thickness ($L/T$) is, in accordance with this invention, between 4:1 and 10:1, the envelope 12 illustrated in FIGURES 1, 2 and 3 having a ratio of 6:1.

The research associated with the development of this invention has shown that if ratios of the order of 1:1 or even 3:1 are employed—and these ratios are common in elastomeric seals—the axial contraction of the base 20 under low temperature conditions breaks the seal between the wall lips and the joint members and causes leakage under low pressures. Under high pressure the use of such ratios quickly results in the fracture of the envelope at or near the junction of the walls and the base. Only by the provision of a thin wall envelope in accordance with this invention can such thermal stresses be accommodated without leakage or fracture. The thin walls provide the necessary small degree of flexibility, even under extreme cold, to accommodate thermal contraction in the back and to ride over minor irregularities on the member surfaces 26 and 28 without flaking; the stress relief strengthens the critical areas of the envelope; and the use of a deformable, non-resilient material having considerable strength ensures that the sudden application of high pressure at extreme cold will not find a rigid envelope unsupported by the chamber walls.

Since the envelope material "Teflon" is inherently non-resilient, the scalloped energizer strip or ring 14 is provided in order to force the annular lips 22a and 24a of the wall sections 22 and 24 into contact with the radial faces 26 and 28 of the swivel joint members 10 and 11. The energizer ring 14 is formed from a punched strip of thin stainless steel and, after being bent to the ring-shape partly illustrated in FIGURE 4, is hard tempered. A large number of equally spaced laterally extending narrow slots 52 are formed by the punching operation on each side of the energizer strip to create a similar number of fingers 54, which extend laterally from, and are joined together by, an integral base portion 56. The relative width of the slots and the fingers is carefully proportioned with regard to the diameter of the seal S so that, when the bent energizer ring 14 is inserted into the envelope 12 as best shown in FIGURES 1 and 3, the fingers 54 touch the envelope only at their free ends 54a and so that, at their free ends 54a, the fingers are almost in contact with one another. As indicated, some degree of preshaping is applied to the energizer ring fingers 54 to bend them out of the plane of the base portion 56, but when the energizer ring 14 is placed within the envelope 12, the fingers 54 are resiliently bent together through a further substantial distance.

It will be appreciated that the energizer ring 14 has little radial strength since it is formed from thin gauge sheet material and its free ends are not secured together. Therefore, radial strength is imparted to the energizer ring 14 by means of the spring expander 16 which is illustrated in full lines in FIGURE 5 as it would appear when unstressed and, in phantom lines, as it would appear when compressed and operative. The spring 16 has sufficient radial strength to force the base portion 56 of the energizer ring 14 into contact with the base portion 20 of the envelope 12, although it need not have sufficient strength to radially expand the envelope to a substantial degree.

Thus, when the seal S is assembled and prior to its insertion in joint J, the fingers 54 of the energizer ring 14 push the annular envelope wall lips 22a and 24a axially apart by a distance greater than the envelope width W. When the seal is placed in the chamber C, however, the envelope 12 is forced back to substantially its original size and the sealing lips 22a and 24a are pressed firmly against the chamber walls 26 and 28 by the free ends 54a of the energizer ring fingers 54. In the latter condition, the energizer fingers 54 have been moved so that, not only are the free ends of the fingers on one side axially moved closer to the free ends of the opposite fingers on the other side, but, and more importantly, the free ends of adjacent fingers ar moved circumferentially closer together. The latter movement results in the uniform support of the sealing lips 22a and 24a.

Thus, the resilient constriction of the fingers 54 in the manner described causes the sealing lips 22a and 24a of the envelope walls 22 and 24 to be pressed outward against the chamber walls with a pressure which is substantially uniform around the entire circumference of the sealing lips and in a way that does not restrict the flexibility or normal movement of the sealing lips and wall portions. As a result, the ability of the envelope 12 to resist thermal and fluid pressure stresses is unhampered by the energizer ring 14 since the energizer ring only contacts the envelope at the center of the back portion 20 and at the lips 22a and 24a of the wall portions 22 and 24, the axial width of the energizer base strip 56 being substantially less than the axial width of the envelope back portion 20.

In summary, it will be noted that by a judicious combination of features a non-elastomeric seal envelope has been developed which is substantially inert and unaffected by temperatures and pressures within the ranges considered and yet, by virtue of the energizer described, possesses sufficient resilience to form a satisfactory seal at pressures down to and below atmospheric. If it is desired to form a seal which will operate satisfactorily at the lower extreme of the temperature range, another well known polymer of trifluorochloroethylene, "Kel-F," may be employed as the envelope material and the envelope should be formed slightly larger in diameter and width than the swivel joint chamber. In such a case, the envelope would be pre-shrunk by chilling with liquid nitrogen or the like before it is inserted into the chamber.

A somewhat modified form of swivel joint seal and swivel joint are illustrated in FIGURES 6 and 7 and it will be assumed that this swivel joint and seal are required to handle pressures in the low and medium ranges at temperatures which extend down to the lower extreme of −350° F. The seal S′ illustrated in FIGURE 6 is basically the same as that described with respect to FIGURES 1 to 5, having an annular envelope 12′ (formed from Kel-F) of rectangular substantially U-shaped section, an energizer ring 14′ and an expander spring 16′. Further, the envelope 12′ has a cylindrical or back portion 20′ from which two integral and generally radial thin side walls 22′ and 24′ extend radially inward to terminate in annular sealing lips 22a′ and 24a′. Thus, in all essential respects the envelope, energizer ring, and expander spring are the same as those described with respect to the seal S of FIGURES 1 to 5.

Similarly, FIGURE 7 illustrates a swivel joint J′ consisting of members 10′ and 11′ rotatably interconnected by ball bearings 32′, the members 10′ and 11′ combining to form an annular seal chamber C′ within which the seal S′ may be accommodated.

The important differences between the seal S′ illustrated in FIGURES 6 and 7 and that described with respect to FIGURES 1 to 5 lie in the dimensions of the envelope and in the use of a retainer ring R in place of the conventional anti-extrusion ring. The outer diameter of the envelope 12′ is considerably less than the diameter of the chamber C′ because the retainer ring encircles the envelope and the width of the envelope is made a few thousandths of an inch greater than that of the chamber C′. The retainer ring R is simply a short length of thin walled steel tubing whose external diameter is a few thousands of an inch less than the internal diameter of the seal chamber C′, whose internal diameter is between 5 and 10 thousandths of an inch smaller than the external diameter of the envelope 12′, and whose width is a few thousandths of an inch less than the width of the seal chamber C′. As diagrammatically illustrated by phantom lines and arrows in FIGURE 6, the retaining ring R is forced over the envelope 12′ to complete the seal S′ and, in so doing, the back 20′ of the envelope is somewhat distorted and the side walls 22′ and 24′ are splayed further apart.

Since the outside diameter of the retainer ring R is substantially less than the chamber diameter the seal S′ may be slipped easily within the chamber C′ without the necessity of prechilling. Further, since the width of the retainer ring R is only slightly less than the width of the chamber C′, the retainer ring R acts effectively as an anti-extrusion ring preventing the material of the envelope 12′ from being forced into the gap G′ between the joint members 10′ and 11′. However, more important than either of these functions, the retainer ring R provides a large degree of initial radial compression and restriction of the back portion 20 of the envelope 12′ to distort the envelope as shown in FIG. 6. As indicated in FIGURE 7, however, when the seal S′ is placed within the chamber C′ the axial splaying of the side walls 22′ and 24′ is restricted and the back portion 20′ of the envelope is compressed axially as well as radially.

The swivel joint J′ of FIGURE 7 differs from that of FIGURE 5 in the provision of an annular lip 60 integral with joint member 10′ which serves to substantially close the radially inner end of the seal chamber C′. The use of the lip 60 is, of course, optional as it has no significant effect upon the efficiency of the seal S′. The chief advantage of the lip is that fluid flow through the joint is less turbulent and erosion of the seal elements resulting from fluid flow is substantially eliminated. Both to ensure that the pressure within the joint J′ is conducted to the seal chamber C′ and to prevent the binding of the joint members during relative rotation, an annular gap 62 is left between the outer end of the lip 60 and the joint member 11′.

Under operating conditions, the envelope 12′ will function substantially as before described with respect to the envelope 12 of FIGURES 1 to 5. But, under cryogenic temperatures, axial shrinkage of the base portion 20′ of the envelope will be substantially reduced even though the temperatures drop far below those anticipated for the seal of FIGS. 1 to 5. The reduction of base shrinkage comes about as a result of the pre-compression of the base 20′, both axially and radially. Therefore, even though fluids having pressures of the order of 5,000 p.s.i. and temperatures of the order of −350° F. are being transmitted by the joint, the seal S′ continues to function because its base shrinkage is insufficient to draw the seal walls away from the chamber walls to the degree apt to cause leakage or fracture of the then rigid material.

From the foregoing description, it is apparent that the seals of the present invention are economical to manufacture and replace, and are able, in a unique manner, to withstand the extremes of temperature and pressure anticipated.

It will therefore also be apparent to those skilled in the art that various modifications and alterations can be made to the seals described without departing from the spirit or scope of the present invention.

The invention having thus been described, that which is claimed to be new and which is desired to be protected by Letters Patent is:

1. In a joint including an annular seal chamber defined by spaced confronting first and second walls and an intermediate wall extending between said first and second walls and being connected to said first wall; a seal in said chamber, said seal comprising an annular U-shaped sealing member having a back portion against and in circumferentially confronting relation to said intermediate wall, the minimum distance between said first and second walls being greater than the corresponding maximum dimension of the back portion of the sealing member, said sealing member also having side portions connected to and extending from said back portion along said first and second walls, said side portions terminating in an-dimension of the back portion of the sealing member, being of a non-corrosive plastic material operable under extremes of temperature and pressure, and an annular U-shaped energizer having a back portion in circumferential engagement with the back portion of the sealing member and first and second groups of fingers connected to the back portion of the energizer and projecting therefrom in confronting relation with the side portions of the sealing members, said fingers having terminal edges resiliently bearing against their associated side portions of the sealing member but substantially only along the annular edges of said side portions, adjacent fingers of each group being contiguous so as to provide a substantially continuous circle of pressure against each of said side portions, and means circumferentially engaging the back portion of the energizer and applying a radially directed force thereagainst for maintaining the back portion of the energizer against the back portion of the sealing member and thus the fingers of the energizer against the side portions of the sealing member.

2. In a seal, a relatively thin flexible sealing wall and an annular energizing means for the wall, both of said wall and means substantially circumscribing a predetermined reference line, said sealing wall being of a non-elastomeric, non-corrosive, relatively hard plastic material which is operable under extremes of temperature and pressure, said energizing means being of resilient spring metal and of substantially U-shaped cross-section, said energizing means including a plurality of pressure applying finger means collectively substantially surrounding said reference line and applying pressure against said wall at a plurality of pressure areas located along a pressure line which substantially circumscribes said reference line, immediately adjacent finger means being contiguous and in a substantially common plane, and each of said finger means being movable transversely of said pressure line in opposite directions out of said plane independently of the immediately adjacent finger means on opposite sides thereof to accommodate flexing of the portion of the sealing wall against which it applies pressure.

3. The seal of claim 2 wherein said pressure applying finger means are tabular fingers interconnected in a circular array and circumscribing said reference line, said fingers having terminal edges individually engaging said sealing wall on said pressure line, said terminal edges having opposite ends providing corners, adjacent corners of adjacent fingers being contiguous, said fingers also having side edges, and adjacent side edges of adjacent fingers diverging relative to each other away from said contiguous corners whereby said fingers are independently yieldable to accommodate flexing of said portions of the sealing wall.

4. The seal of claim 2 wherein said material is selected from the group consisting of "Teflon" and "Kel-F."

5. A seal comprising an annular sealing element having a back portion and a side portion connected to and extending from said back portion and terminating in an annular edge, said side portion being of a non-elastomeric, non-fibrous, relatively hard plastic material which is non-corrosive and operable over extremes of temperature and pressure; an annular energizer having a back portion in circumferential engagement with the back portion of the sealing element and having a group of spring fingers connected to the back portion of the energizer and projecting therefrom in confronting relation with the side portion of the sealing element, said fingers having terminal edges resiliently flexibly bearing against the side portion of the sealing element but substantially only along said annular edge of said side portion, said fingers having corners at opposite ends of their terminal edges with adjacent corners of adjacent fingers being contiguous so that said edges of the fingers form a substantially uninterrupted circumferential assemblage whereby a substantially continuous circle of pressure is applied against said side portion, each finger being yieldable independently of the other fingers in order to accommodate flexing of short arcuate segments of the sealing element independently of the remainder of the sealing element; and means circumferentially engaging the back portion of the energizer and applying a radially directed force thereagainst for maintaining the back portion of the energizer against the back portion of the sealing element and thus the terminal edges of the fingers on said circle of pressure.

6. The seal of claim 5 wherein the length of the side portion of the sealing element as measured from the back portion of the sealing element to the annular edge of the side portion is from four to ten times greater than the thickness of the side portion of the sealing element.

7. The seal of claim 5 wherein said side portion of the sealing element projects inward from its back portion and wherein said radially directed force applying means is a resiliently diametrically constrictable spring positioned within and diametrically constricted by the back portion of the energizer so as to bear outward on said back portion.

8. The seal of claim 5 wherein said side portion of the sealing element projects inward from its back portion, and wherein an annular retainer circumscribes the back portion of the sealing element.

References Cited by the Examiner

UNITED STATES PATENTS

| | | | |
|---|---|---|---|
| 1,621,272 | 3/1927 | Raymond | 277—152 |
| 1,963,465 | 6/1934 | Johnson | 277—49 |
| 2,366,161 | 1/1945 | Tweedale | 277—206 |
| 2,454,036 | 11/1948 | Clayton-Wright | 277—152 X |
| 2,512,883 | 6/1950 | Warren | 277—152 X |
| 2,701,155 | 2/1955 | Estel | 277—152 |
| 3,100,648 | 8/1963 | Lee et al. | 277—163 X |

FOREIGN PATENTS

| | | |
|---|---|---|
| 589,768 | 6/1947 | Great Britain. |
| 758,447 | 10/1956 | Great Britain. |

SAMUEL ROTHBERG, *Primary Examiner.*

LEWIS J. LENNY, *Examiner.*

L. J. RANEY, *Assistant Examiner.*